United States Patent [19]
Vogt

[11] 3,898,214
[45] Aug. 5, 1975

[54] BENZAZEPINE DIONES

[75] Inventor: Berthold Richard Vogt, Yardley, Pa.

[73] Assignee: E. R. Squibb & Sons, Inc., Princeton, N.J.

[22] Filed: July 22, 1974

[21] Appl. No.: 490,453

[52] U.S. Cl. .......... 260/239.3 B; 424/244; 424/248; 424/250; 424/267; 424/274
[51] Int. Cl. ................ C07d 41/00; C07d 41/08
[58] Field of Search ............... 260/239.3 B

[56] References Cited
OTHER PUBLICATIONS
Walker et al. "J. Org Chem." (1971) Vol. 36, No. (3) pp. 461–465.

*Primary Examiner*—Henry R. Jiles
*Assistant Examiner*—Robert T. Bond
*Attorney, Agent, or Firm*—Lawrence S. Levinson; Merle J. Smith; Burton Rodney

[57] ABSTRACT

Compounds of the formula

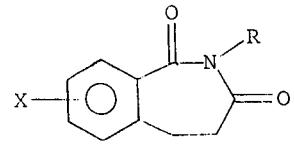

have been found to possess antifungal activity.

5 Claims, No Drawings

BENZAZEPINE DIONES

OBJECTS OF THE INVENTION

It is an object of the present invention to provide novel compounds which have antifungal activity. Another object is to provide methods for the preparation of these novel compounds. These and other objects of the present invention will be apparent from the following description.

SUMMARY OF THE INVENTION

Dihydro-2-benzazepine-1,3-diones of the formula

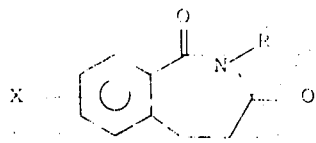

wherein R is lower alkyl, alkylamine, dialkylaminoalkyl or N-heterocyclic alkyl, and X is H, lower alkyl, lower alkoxy, F, Cl, Br or $CF_3$, have been found to possess antifungal activity.

DETAILED DESCRIPTION

The present invention is directed to dihydro-2-benzazepine-1,3-dione compounds which have been found to possess antifungal activity. The compounds of the present invention have the general formula

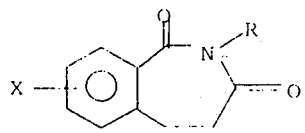

I wherein R is alkyl of from 1 to 4 carbon atoms, alkylamine wherein the alkyl group has from 1 to 4 carbon atoms, or dialkylaminoalkyl wherein each alkyl group has from 1 to 4 carbon atoms, or N-heterocyclic alkyl wherein the alkyl group has from 1 to 4 carbon atoms and the heterocyclic group is pyrrolidino, piperidino, morpholino, piperazino or N-alkylpiperazino wherein the alkyl group has from 1 to 4 carbon atoms, and X is H, alkyl of from 1 to 4 carbon atoms, alkoxy of from 1 to 4 carbon atoms, $CF_3$, F, Cl or Br, preferably F or Cl.

The compounds of the present invention may be prepared by catalytically hydrogenating under conventional conditions a 3-hydroxy-1H-2-benzazepin-1-one II

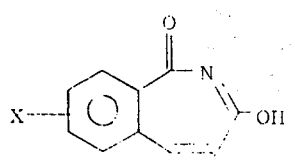

II to yield a 4,5-dihydro-2H-2-benzazepine-1,3-dione III.

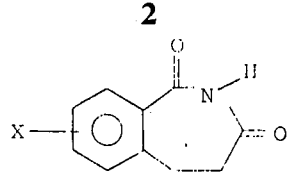

III

The latter compound is then reacted with an appropriate base, such as thallous ethoxide, NaH or K-t-butoxide in an essentially inert solvent and the resulting salt reacted with an appropriate alkylating agent of the formula R-Z wherein R is as defined above and Z is a suitable leaving group such as chlorine, bromine, iodine, alkyl sulfonate or aryl sulfonate to yield a compound of formula I. This reaction may be carried out in an optional, essentially non-reactive organic solvent such as hexamethylphosphorous triamide, dimethylformamide, dimethylsulfoxide, 1,2-dimethoxyethane, benzene, toluene or xylene.

Alternatively, the compounds of the present invention may be prepared by reacting a compound of formula II with an appropriate base, such as thallous ethoxide, NaH or K-t-butoxide in an essentially inert solvent and the resulting salt reacted with an appropriate alkylating agent of the formula R-Z wherein R is as defined above and Z is a suitable leaving group such as chlorine, bromine, iodine, alkyl sulfonate or aryl sulfonate. This reaction may be carried out in an optional, essentially non-reactive organic solvent such as hexamethylphosphorous triamide, dimethylformamide, dimethylsulfoxide, 1,2-dimethoxyethane, benzene, toluene or xylene.

The resulting compound IV

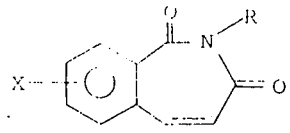

IV is then catalytically hydrogenated to yield a compound of formula I.

The final compounds I and their pharmaceutically acceptable acid-addition salts of the present invention exhibt antifungal activity against Try. menta at concentrations of from about 50 mcg/ml to about 400 mcg/ml in mammalian species, e.g., mice and rats.

It will be understood by those skilled in the art that the 3-hydroxy-1H-2-benzazepin-1-one of formula II may exist in any or all of the following tautomeric forms:

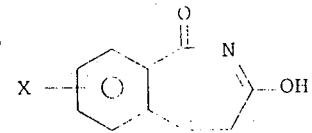

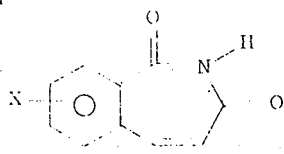

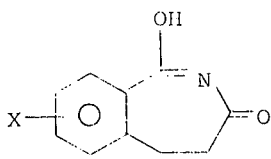

As to the pharmaceutically acceptable salts, those coming within the purview of this invention include the pharmaceutically acceptable acid-addition salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, fumaric, tartaric, citric, acetic, benzoic, 2-acetoxybenzoic, salicylic, succinic acid, theophylline, 8-chlorotheophylline, p-aminobenzoic, p-acetamidobenzoic, or methanesulfonic.

The following examples illustrate the present invention without, however, limiting the same thereto. All temperatures are expressed in degrees Centigrade.

EXAMPLE 1

2-[2-(Dimethylamino)ethyl]-4,5-dihydro-2H-2-benzazepine-1,3-dione, fumarate salt A. 4,5-Dihydro-2H-2-benzazepin-1,3-dione 3-Hydroxy-1H-2-benzazepin-1-one, 9.0 g (0.052 mole), and 10% Pd/C (400 mg) are stirred in absolute ethanol (400 ml) under an atmosphere of hydrogen until an uptake of 1335 ml of the gas is reached. The reaction mixture is stirred with a small amount of celite, filtered through a celite pad and the filtrate evaporated to dryness. Yield: 9.28 g of a brown precipitate, mp 102°–105°. The precipitate is taken up in hot absolute ethanol (400 ml), treated with activated carbon and filtered. The carbon is washed with hot absolute ethanol (200 ml), the filtrates combined and stripped to dryness. Yield: 8.6 g. This product is recrystallized from a minimum amount of ethanol (40–50 ml) to yield a first crop of 6.6 g, mp 111°–113°, and a second crop of 642.1 mg, mp 107°–109°.

B.
2-[2-Dimethylamino)ethyl]-4,5-dihydro-2H-2-benzazepine-1,3-dione, fumarate salt 4,5-Dihydro-2H-2-benzazepine-1,3-dione, 2.5 g (.0143 mole), is stirred with 4.46 g (0.0179 mole, 1.25 eq.) of thallous ethoxide in dry tetrahydrofuran (49 ml) for 20 minutes. The precipitates are filtered, washed with ether and then dried in a vacuum oven at room temperature for 1 hours. Yield: 5.2 g of the thallous salt (I).

Meanwhile, 2.73 g (0.019 mole, 1.3 eq.) of $Cl(CH_2)_2N-(CH_3)_2 \cdot HCl$ are suspended in toluene (94 ml) and quickly shaken with a solution of 5.0 g KOH in 5.0 ml $H_2O$. The organic phase is stirred with 4A molecular sieves for 30 minutes followed by the dropwise addition of this solution to a refluxing suspension of (I) in dry toluene (125 ml) over a period of 30 minutes under argon. After an additional 3 hours of refluxing another 1.3 eq. of $Cl(CH_2)_2N(CH_3)_2$ are added, followed by refluxing for another 4.5 hours. The reaction mixture is cooled and filtered through celite, the celite pad being washed subsequently with toluene (200 ml). The filtrate is passed through a Florisil column (1¼ × 4 inches), and the column eluted with benzene (600 ml). The clear eluate is evaporated to dryness. Yield: 3.39 g of syrup; TLC (alumina; $CHCl_3$:EtOAc — 6:4), shows a major component, $R_f$ 0.58 plus a trace of another, $R_f$ 0.30. The syrup is taken up in acetone (65 ml) and mixed with a solution of 1.62 g of (0.014 mole) of fumaric acid in 130 ml of acetone. The clear solution is evaporated to dryness. Yield: 4.42 g (87%). This residue is triturated with a minimum amount of acetone (20 ml), stirred for 45 minutes, filtered and dried in vacuo for 7 hours. Yield: 3.85 g of product, mp 146°–148°.

The product is recrystallized twice from absolute ethanol (25–35 ml), dried overnight at 60° and for 4 hours at 100°. Yield: 2.15 g, mp 143°–145°.

EXAMPLE 2

2-[3-(Dimethylamino)propyl]-4,5-dihydro-2H-2-benzazepine-1,3-dione, fumarate salt 4,5-Dihydro-2H-2-benzazepine-1,3-dione, 3.0 g, (0.0171 mole) is stirred with 5.34 g (0.024 mole, 1.25 eq.) of thallous ethoxide in dry tetrahydrofuran (58 ml) for 25 minutes. The precipitates are filtered, washed with ether and dried under vacuum for 30 minutes. Yield: 6.35 g of thallous salt, mp 190°–194°(I).

Meanwhile, 3.52 g (0.0223 mole, 1.3 eq.) of $HCl \cdot Cl(CH_2)_3N(CH_3)_2$ are suspended in toluene (110 ml) and quickly shaken with a solution of 5.9 g KOH in 5.9 ml water. The organic phase is dried over 4A molecular sieves for 30 minutes and then added dropwise over a period of 30 minutes to a refluxing suspension of (I) in 150 ml dry toluene under argon. The mixture is refluxed for 3 hours after which time another 1.3 eq. of the free base of the alkylating agent are added. The mixture is refluxed for another 5 hours. An infrared spectrum of the precipitates indicates that the thallous salt (I) has completely reacted so the suspension is filtered through a celite pad. The celite pad is washed with toluene (200 ml), the washings and filtrate are combined and passed through a Florisil column (1⅞ × 4 inches). The column is washed with benzene (600 ml) and the clear eluate is evaporated. Yield: 4.03 g of a light yellow syrup; $R_f$ 0.56 (alumina; $CHCl_3$:EtOAc — 6:4).

The syrup is taken up in acetone (72 ml), treated with an equivalent amount of fumaric acid (1.80 g, 0.0155 mole) in acetone (144 ml), and evaporated to dryness. The product (6.75 g) which is obtained is triturated with a minimal amount of acetone (25 ml). The precipitates are stirred in the solvent for 45 minutes, filtered, air-dried and then dried under vacuum. Yield: 4.88 g of product (75–78 percent), mp 112°–114°.

These precipitates are recrystallized 3 times from absolute ethanol (25–35 ml). Final yield: 4.025 g, mp 115°–116°.

EXAMPLES 3–10

Following the procedure of Example 2 but substituting the compounds indicated in column I below, for the Hcl salt of 3-(dimethylamino)propyl chloride in Example 2, the products indicated in column II are obtained.

| | I | II |
|---|---|---|
| 3. | diethylaminoethyl chloride | 2-[2-(diethylamino)ethyl]-4,5-dihydro-2H-2-benzazepine-1,3-dione fumarate salt |
| 4. | 2-(1-pyrrolidinyl)-ethyl chloride | 2-[2-(1-pyrrolidine)ethyl]-4,5-dihydro-2H-2-benzazepine-1,3-dione fumarate salt |
| 5. | 3-(1-piperidinyl)-propyl chloride | 2-[3-(1-piperidinyl)propyl]-4,5-dihydro-2H-2-benzazepine-1,3-dione fumarate salt |
| 6. | 2-(1-piperazinyl)-ethyl chloride | 2-[2-(1-piperazinyl)ethyl]-4,5-dihydro-2H-2-benzazepine-1,3-dione fumarate salt |
| 7. | 2-(1-morpholinyl)-ethyl chloride | 2-[2-(1-morpholinyl)ethyl]-4,5-dihydro-2H-2-benzazepine-1,3-dione fumarate salt |
| 8. | 3-(4-methyl-1-piperazinyl)propyl chloride | 2-[3-(4-methyl-1-piperazinyl)propyl]-4,5-dihydro-2H-2-benzazepine-1,3-dione fumarate salt |
| 9. | methyl iodide | 2-methyl-4,5-dihydro-2H-2-benzazepine-1,3-dione fumarate salt |
| 10. | aminopropyl chloride | 2-(3-aminopropyl)-4,5-dihydro-2H-2-benzazepine-1,3-dione fumarate salt |

| | I | II |
|---|---|---|
| 11. | 7-chloro-3-hydroxy-1H-2-benzazepin-1-one | 2-[2-(dimethylamino)ethyl]-7-chloro-4,5-dihydro-2H-2-benzazepine-1,3-dione |
| 12. | 8-chloro-3-hydroxy-1H-2-benzazepin-1-one | 2-[2-(dimethylamino)ethyl]-8-chloro-4,5-dihydro-2H-2-benzazepine-1,3-dione |
| 13. | 7-fluoro-3-hydroxy-1H-2-benzazepin-1-one | 2-[2-(dimethylamino)ethyl]-7-fluoro-4,5-dihydro-2H-2-benzazepine-1,3-dione |
| 14. | 7-methyl-3-hydroxy-1H-2-benzazepin-1-one | 2-[2-(dimethylamino)ethyl]-7-methyl-4,5-dihydro-2H-2-benzazepine-1,3-dione |
| 15. | 8-methyl-3-hydroxy-1H-2-benzazepin-1-one | 2-[2-(dimethylamino)ethyl]-8-methyl-4,5-dihydro-2H-2-benzazepine-1,3-dione |
| 16. | 7-n-propyl-3-hydroxy-1H-2-benzazepin-1-one | 2-[2-(dimethylamino)ethyl]-7-n-propyl-4,5-dihydro-2H-2-benzazepine-1,3-dione |
| 17. | 7-methoxy-3-hydroxy-1H-2-benzazepin-1-one | 2-[2-(dimethylamino)ethyl]-7-methoxy-4,5-dihydro-2H-2-benzazepine-1,3-dione |
| 18. | 8-methoxy-3-hydroxy-1H-2-benzazepin-1-one | 2-[2-(dimethylamino)ethyl]-8-methoxy-4,5-dihydro-2H-2-benzazepine-1,3-dione |
| 19. | 7-n-butoxy-3-hydroxy-1H-2-benzazepin-1-one | 2-[2-(dimethylamino)ethyl]-7-n-butoxy-4,5-dihydro-2H-2-benzazepine-1,3-dione |
| 20. | 7-(trifluoromethyl)-3-hydroxy-1H-2-benzazepin-1-one | 2-[2-(dimethylamino)ethyl]-7-(trifluoromethyl)-4,5-dihydro-2H-2-benzazepine-1,3-dione |
| 21. | 8-(trifluoromethyl)-3-hydroxy-1H-2-benzazepin-1-one | 2-[2-(dimethylamino)ethyl]-8-(trifluoromethyl)-4,5-dihydro-2H-2-benzazepine-1,3-dione |
| 22. | 9-chloro-3-hydroxy-1H-2-benzazepin-1-one | 2-[2-(dimethylamino)ethyl]-9-chloro-4,5-dihydro-2H-2-benzazepine-1,3-dione |
| 23. | 6-chloro-3-hydroxy-1H-2-benzazepin-1-one | 2-[2-(dimethylamino)ethyl]-6-chloro-4,5-dihydro-2H-2-benzazepine-1,3-dione |

EXAMPLES 11–23

Following the procedure of Example 1 but substituting the compounds indicated in Column I below, for 3-hydroxy-1H-2-benzazepin-1-one in Example 1, the compounds indicated in Column II are obtained.

EXAMPLES 24–33

Following the procedure of Example 2 but substituting the compounds indicated in Column I below for 4,5-dihydro-2H-2-benzazepine-1,3-dione and the hydrochloride of those indicated in Column II below for 3-(dimethylamino)propyl chloride in Example 2, the compounds indicated in Column III are obtained.

| | I | II | III |
|---|---|---|---|
| 24. | 7-chloro-4,5-dihydro-2H-2-benzazepine-1,3-dione | 2-(1-pyrrolidino)-ethyl chloride | 2-[2-(1-pyrrolidino)ethyl]-7-chloro-4,5-dihydro-2H-2-benzazepine-1,3-dione |
| 25. | 7-chloro-4,5-dihydro-2H-2-benzazepine-1,3-dione | 3-(1-piperidinyl)-propyl chloride | 2-[3-(1-piperidinyl)propyl]-7-chloro-4,5-dihydro-2H-2-benzazepine-1,3-dione |
| 26. | 7-chloro-4,5-dihydro-2H-2-benzazepine-1,3-dione | 3-(1-morpholinyl)propyl chloride | 2-[3-(1-morpholinyl)propyl]-7-chloro-4,5-dihydro-2H-2-benzazepine-1,3-dione |
| 27. | 7-chloro-4,5-dihydro-2H-2-benzazepine-1,3-dione | 3-[1-(4-methyl-piperizinyl)propyl]-chloride | 2-[3-[1-(4-methylpiperizinyl)-propyl]]-7-chloro-4,5-dihydro-2H-2-benzazepine-1,3-dione |
| 28. | 7-methyl-4,5-dihydro-2H-2-benzazepine-1,3-dione | 3-(1-piperidinyl)-propyl chloride | 2-[3-(1-piperidinyl)propyl]-7-methyl-4,5-dihydro-2H-2-benzazepine-1,3-dione |
| 29. | 7-methoxy-4,5-dihydro-2H-2-benzazepine-1,3-dione | 3-(1-piperidinyl)-propyl chloride | 2-[3-(1-piperidinyl)propyl]-7-methoxy-4,5-dihydro-2H-2-benzazepine-1,3-dione |

—Continued

| | I | II | III |
|---|---|---|---|
| 30. | 7-(trifluoro-methyl)-4,5-dihydro-2H-2-benzazepine-1,3-dione | 3-(1-piperidinyl)-propyl chloride | 2-[3-(1-piperidinyl)-propyl]-7-(trifluoromethyl)-4,5-dihydro-2H-2-benzazepine-1,3-dione |
| 31. | 6-chloro-4,5-dihydro-2H-2-benzazepine-1,3-dione | 3-(1-piperidinyl)-propyl chloride | 2-[3-(1-piperidinyl)-propyl]-6-chloro-4,5-dihydro-2H-2-benzazepine-1,3-dione |
| 32. | 8-chloro-4,5-dihydro-2H-2-benzazepine-1,3-dione | 3-(1-piperidinyl)-propyl chloride | 2-[3-(1-piperidinyl)-propyl]-8-chloro-4,5-dihydro-2H-2-benzazepine-1,3-dione |
| 33. | 9-chloro-4,5-dihydro-2H-2-benzazepine-1,3-dione | 3-(1-piperidinyl)-propyl chloride | 2-[3-(1-piperidinyl)-propyl]-9-chloro-4,5-dihydro-2H-2-benzazepine-1,3-dione |

What is claimed is:

1. A compound of the formula

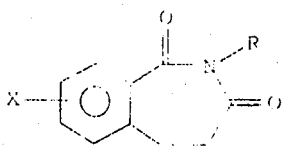

wherein R is alkyl of from 1 to 4 carbon atoms, alkylamine wherein the alkyl group is from 1 to 4 carbon atoms, dialkylaminoalkyl wherein each alkyl group is from 1 to 4 carbon atoms, or N-heterocyclic alkyl wherein the alkyl group is from 1 to 4 carbon atoms and the heterocyclic group is pyrrolidino, piperidino, morpholino, piperazino or N-alkylpiperazino wherein the N-alkyl group is from 1 to 4 carbon atoms, and wherein X is H, alkyl of from 1 to 4 carbon atoms, alkoxy of from 1 to 4 carbon atoms, $CF_3$, F, Cl or Br, and pharmaceutically acceptable acid-addition salts thereof.

2. A compound of claim 1 wherein R is dialkylaminoalkyl.

3. A compound of claim 2 wherein X is H and R is dimethylaminoethyl.

4. A compound of claim 2 wherein X is H and R is dimethylaminopropyl.

5. A compound of claim 1 wherein R is other than alkyl of from 1 to 4 carbon atoms.

* * * * *

UNITED STATES PATENT AND TRADEMARK OFFICE
CERTIFICATE OF CORRECTION

PATENT NO. : 3,898,214
DATED : August 5, 1975
INVENTOR(S) : Berthold Richard Vogt It is certified that error appears in the above-identified patent and that said Letters Patent are hereby corrected as shown below:

On the title page, column 2, the formula should read

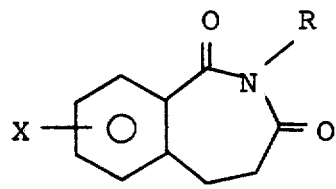

Column 1, the first formula in the column should read

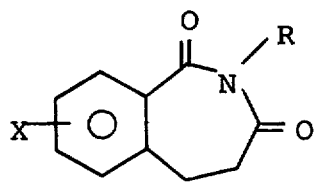

Column 1, formula I should read

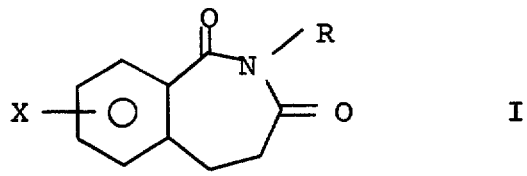

UNITED STATES PATENT AND TRADEMARK OFFICE
CERTIFICATE OF CORRECTION

PATENT NO. : 3,898,214
DATED : August 5, 1975
INVENTOR(S) : Berthold Richard Vogt Page 2 of 3

It is certified that error appears in the above-identified patent and that said Letters Patent are hereby corrected as shown below:

Column 1, formula II should read

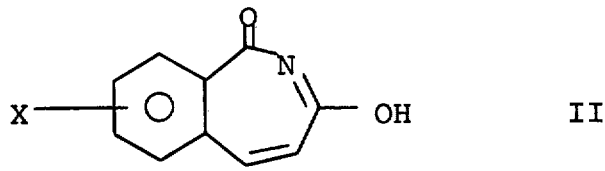   II

Column 2, formula III should read

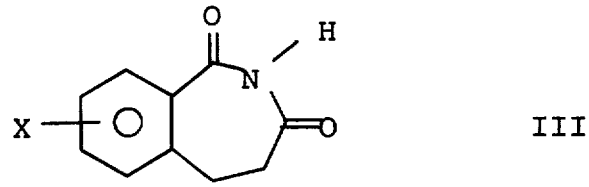   III

Column 2, formula IV should read

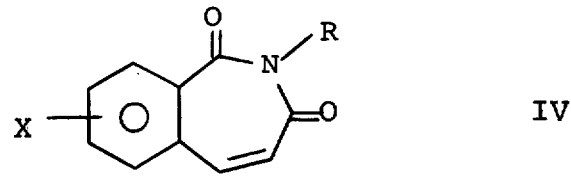   IV

UNITED STATES PATENT AND TRADEMARK OFFICE
CERTIFICATE OF CORRECTION

PATENT NO. : 3,898,214
DATED : August 5, 1975
INVENTOR(S) : Berthold Richard Vogt It is certified that error appears in the above-identified patent and that said Letters Patent are hereby corrected as shown below:

Column 2, the last two formulas in the column should read

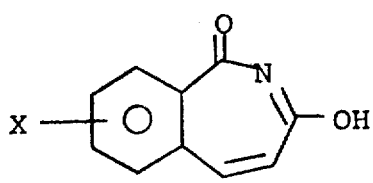 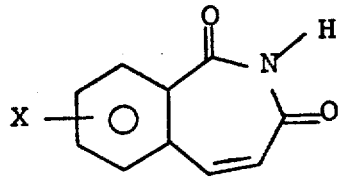

Column 3, the formula should read

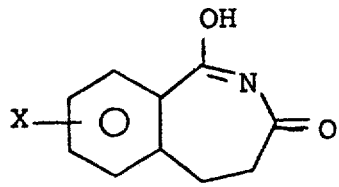

Column 7, claim 1, the formula should read

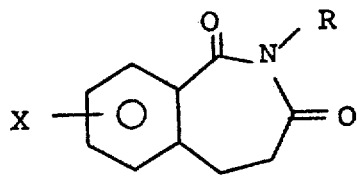

Column 1, line 51, "f" should read --F--.
Column 3, line 66, "4A" should read --4A°--.
Column 4, line 37, "4A" should read --4A°--.

Signed and Sealed this twenty-first Day of October 1975

[SEAL]

Attest:

RUTH C. MASON
Attesting Officer

C. MARSHALL DANN
Commissioner of Patents and Trademarks